(12) United States Patent
Lin (10) Patent No.: US 10,650,709 B2
(45) Date of Patent: *May 12, 2020

(54) METHOD AND APPARATUS FOR CONTROLLING FLEXIBLE SCREEN, AND ELECTRONIC DEVICE

(71) Applicant: GUANGDONG OPPO MOBILE TELECOMMUNICATIONS CORP., LTD., Dongguan, Guangdong (CN)

(72) Inventor: Yugui Lin, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/433,919

(22) Filed: Jun. 6, 2019

(65) Prior Publication Data

US 2019/0287435 A1   Sep. 19, 2019

Related U.S. Application Data

(63) Continuation of application No. 16/313,492, filed as application No. PCT/CN2017/089393 on Jun. 21, 2017.

(30) Foreign Application Priority Data

Jul. 8, 2016   (CN) .......................... 2016 1 0539091

(51) Int. Cl.
G09F 9/30      (2006.01)
G06F 1/16      (2006.01)
H04M 1/02      (2006.01)

(52) U.S. Cl.
CPC ............ G09F 9/301 (2013.01); G06F 1/1652 (2013.01); G09F 9/30 (2013.01); H04M 1/0268 (2013.01); H04M 2250/22 (2013.01)

(58) Field of Classification Search
CPC .......... G09F 9/301; G09F 9/30; G06F 1/1652; H04M 1/0268; H04M 2250/22
See application file for complete search history.

(56) References Cited

U.S. PATENT DOCUMENTS 6,671,011 B1   12/2003   Zhang et al.
8,001,711 B2   8/2011    LaFarre et al.
(Continued)

FOREIGN PATENT DOCUMENTS

CN   102984893   3/2013
CN   103558974   2/2014
(Continued)

OTHER PUBLICATIONS

SIPO, First Office Action for CN Application No. 201610539091, dated Jul. 4, 2017.
(Continued)

Primary Examiner — Sejoon Ahn
(74) Attorney, Agent, or Firm — Hodgson Russ LLP (57) ABSTRACT

The present disclosure provides a method and an apparatus for controlling a flexible screen and an electronic device. The method includes: obtaining a press parameter with respect to a motor drive switch; and controlling a motor to rotate according to the press parameter, to unfold or fold the flexible screen. The flexible screen can be controlled to unfold and fold to obtain a suitable screen size.

13 Claims, 6 Drawing Sheets

(56) References Cited

U.S. PATENT DOCUMENTS

| | | | |
|---|---|---|---|
| 10,314,492 B2* | 6/2019 | Connor | G09B 19/0092 |
| 10,429,888 B2* | 10/2019 | Connor | G06F 1/1637 |
| 10,437,295 B1* | 10/2019 | Filipovic | G06F 1/1626 |
| 2010/0004026 A1 | 1/2010 | Lee et al. | |
| 2012/0212418 A1 | 8/2012 | Shiota | |
| 2015/0340004 A1 | 11/2015 | Pang | |
| 2016/0026381 A1 | 1/2016 | Kim et al. | |
| 2016/0034000 A1 | 2/2016 | Lee et al. | |
| 2016/0077548 A1 | 3/2016 | Lim et al. | |
| 2016/0085319 A1 | 3/2016 | Kim et al. | |
| 2016/0132074 A1 | 5/2016 | Kim et al. | |

FOREIGN PATENT DOCUMENTS

| | | |
|---|---|---|
| CN | 103645628 | 3/2014 |
| CN | 203713698 | 7/2014 |
| CN | 104485055 | 4/2015 |
| CN | 104715686 | 6/2015 |
| CN | 105068642 | 11/2015 |
| CN | 105094619 | 11/2015 |
| CN | 105116996 | 12/2015 |
| CN | 105204735 | 12/2015 |
| CN | 105247853 | 1/2016 |
| CN | 205264268 | 5/2016 |
| CN | 105652970 | 6/2016 |
| CN | 105677028 | 6/2016 |
| CN | 205302248 | 6/2016 |
| CN | 106205390 | 12/2016 |
| KR | 20090030138 | 3/2009 |

OTHER PUBLICATIONS

SIPO, Second Office Action for CN Application No. 201610539091, dated Oct. 11, 2017.

WIPO, ISR for PCT/CN2017/089393, dated Sep. 12, 2017.

SIPO, Notification to Grant Patent Right for Invention for CN Application No. 201610539091, dated Feb. 1, 2018.

EPO, Office Action for EP Application No. 17823521, dated Jun. 4, 2019.

USPTO, Notice of Allowance for U.S. Appl. No. 16/313,492, dated Dec. 27, 2019.

* cited by examiner

METHOD AND APPARATUS FOR CONTROLLING FLEXIBLE SCREEN, AND ELECTRONIC DEVICE

CROSS-REFERENCE TO RELATED APPLICATION

The present application is a continuation of U.S. application Ser. No. 16/313,492, filed Dec. 27, 2018, which is a national phase entry of International Application No. PCT/CN2017/089393, filed Jun. 21, 2017, which claims priority to Chinese Patent Application No. 201610539091.5, filed Jul. 8, 2016. The entire disclosures of the aforementioned application are incorporated herein by reference.

FIELD

The present disclosure relates to the field of electronic device technologies, and more particularly to a method and an apparatus for controlling a flexible screen of an electronic device and an electronic device.

BACKGROUND

With the rapid development of information technologies, electronic devices (such as mobile phones and tablet computers) are upgraded faster and faster, and a development trend of display screens of the electronic devices is adopting flexible screens as the displaying screens. The flexible screen is also referred to as a flexible display screen, which has features of light weight, bendability, and portability, and thus has become a future development direction of the display screen.

SUMMARY

Embodiments of a first aspect of the present disclosure provide a method for controlling a flexible screen of an electronic device. The method includes: obtaining a press parameter with respect to a motor drive switch; and controlling a motor to rotate according to the press parameter, to unfold or fold the flexible screen.

Embodiments of a second aspect of the present disclosure provide an apparatus for controlling a flexible screen of an electronic device. The apparatus includes a processor and a memory configured to store instructions executable by the processor. The processor is configured to run a program corresponding to the instructions by reading the instructions stored in the memory, so as to: obtain a press parameter with respect to a motor drive switch; and control a motor to rotate according to the press parameter, to unfold or fold the flexible screen.

Embodiments of a third aspect of the present disclosure provide an electronic device. The electronic device includes a winding tube, a flexible screen, a motor drive switch, a motor, and a control circuit. The flexible screen is operable to wind around the winding tube. The motor drive switch is configured to obtain a press parameter when the motor drive switch is pressed. The control circuit is coupled to the motor drive switch and the motor, and is configured to receive the press parameter, and to control the motor to rotate according to the press parameter, to unfold or fold the flexible screen.

In a fourth aspect, a computer readable storage medium is provided. The computer readable storage medium is stored with computer programs, wherein the computer programs are configured to enable a processor to execute the method for controlling a flexible screen of an electronic device described in embodiments of the first aspect of the present disclosure.

EMBODIMENTS OF THE PRESENT DISCLOSURE

At present, a flexible screen (including a touch screen and a display screen) of an electronic device can realize an effect of large size display. Although the flexible screen can be unfolded, it is unable to control to unfold and fold the flexible screen better. The present disclosure provides a method for controlling a flexible screen of an electronic device and an electronic device, which may control to unfold or fold the flexible screen.

The electronic device described in embodiments of the present disclosure may include a smartphone (such as Android Phone, iOS Phone, and Windows Phone), a tablet computer, a PDA (personal digital assistant), a notebook computer, a MID (mobile internet device), or a wearable device. The above electronic devices are exemplary, and are not exhaustive. The electronic device is not limited to these. It should be noted that, each of the above electronic devices is provided with the flexible screen and a motor drive switch.

Figure 1:
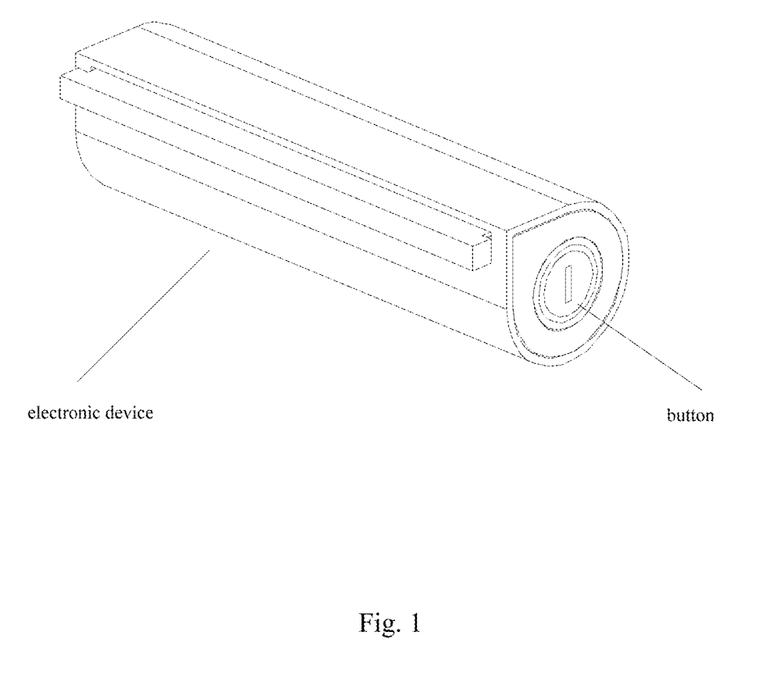
FIG. 1 is a schematic diagram of an electronic device according to embodiments of the present disclosure.
Figure 2:
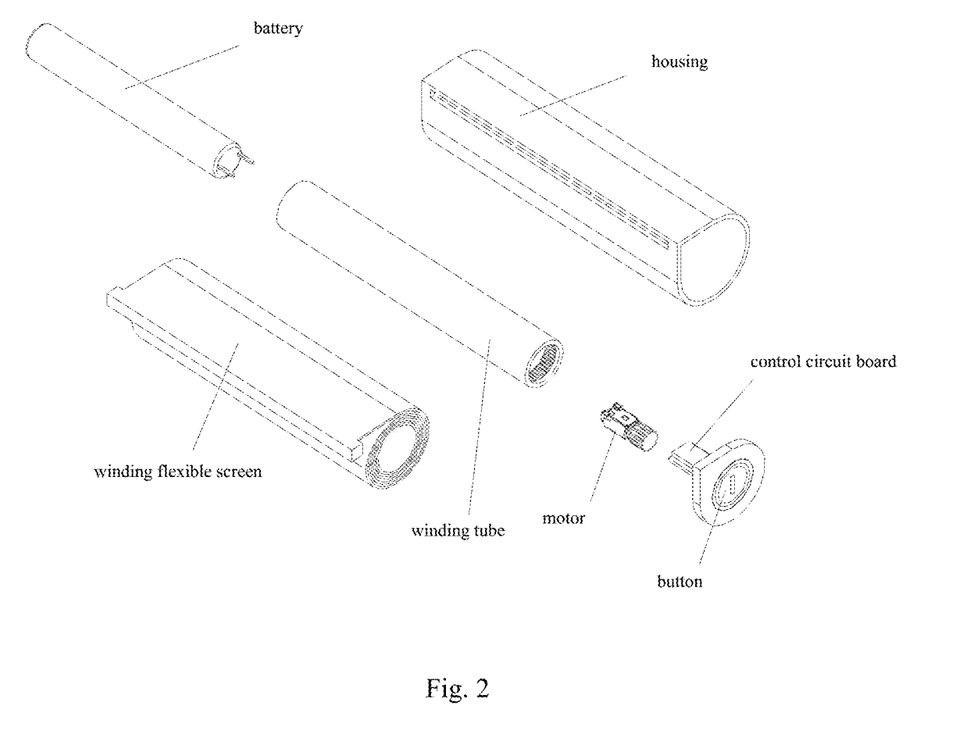
FIG. 2 is a schematic diagram of components of the electronic device in FIG. 1a according to embodiments of the present disclosure.

It should be noted that, as illustrated in FIG. 1, which shows an electronic device, the electronic device includes a button, which is the motor drive switch in embodiments of the present disclosure. The specific structure of the electronic device is as illustrated in FIG. 2, which includes a winding flexible screen (flexible screen for short), a winding tube (hollow), a battery, a motor, a housing, a control circuit board, and a button. The winding flexible screen is winded around the winding tube. The battery may be inserted into the winding tube from one end. The motor, the control circuit board and the button (motor drive switch) may be installed from the other end. The control circuit board is configured to control the motor to rotate. The button is configured to activate the control circuit board. When a user presses the button, the control circuit board may be used to drive the motor to rotate, to drive the winding tube to rotate, and thus unfold or fold the flexible screen. The button may be a physical button, a touch button, or a sensor. The sensor can be a fingerprint sensor, a temperature sensor and the like. When the flexible screen is unfolded fully, the flexible screen is in a fully unfolded state. When the flexible screen is folded fully, the flexible screen is in a fully folded state. When a value of rotation turns of the motor reaches a limit, the flexible screen is in the fully unfolded state or the fully folded state, and the motor stops rotating. Certainly, when the flexible screen is in the fully unfolded state, it is possible to drive the motor to rotate, to fold the flexible screen. When the flexible screen is in the fully folded state, it is possible to drive the motor to rotate, to unfold the flexible screen. When the flexible screen is in a partially unfolded state, it is possible to drive the motor to rotate, to unfold or fold the flexible screen.

Figure 3:
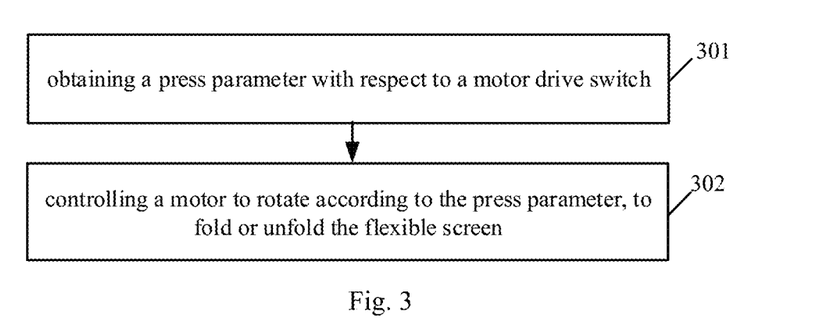
FIG. 3 is a flow chart of a method for controlling a flexible screen of an electronic device according to a first embodiment of the present disclosure.

Based on the above electronic device, as illustrated in FIG. 3, the method for controlling the flexible screen of the electronic device described in this embodiment includes following operations.

At block 301, a press parameter with respect to the motor drive switch is obtained.

The motor drive switch may be a physical button or a touch button. Certainly, the motor drive switch may be a sensor, for example, a pressure sensor, a fingerprint sensor and the like. When the user presses the pressure sensor or the fingerprint sensor, a press parameter corresponding to the pressure sensor or the fingerprint sensor may be obtained. The press parameter can be a press intensity, a press duration and the like.

In embodiments of the present disclosure, the press parameter with respect to the motor drive switch may include, but is not limited to, at least one of the number of presses of pressing the motor drive switch, the press intensity of pressing the motor drive switch, the press duration of pressing the motor drive switch, and a press area of pressing the motor drive switch. The number of presses may be the number of presses of pressing the motor drive switch within a preset time period. The press intensity may be a maximum press intensity or a mean press intensity of pressing the motor drive switch during a process from the user contacting with the motor drive switch to leaving the motor drive switch, or a press intensity at a certain time point. For example, if the time point is 0.01 s, and the duration of the user pressing the motor drive switch is 2 s, then the press intensity corresponding to this press process is the press intensity of pressing the motor drive switch at 0.01 s. The press duration may be an entire time period from the user contacting with the motor drive switch to leaving the motor drive switch, or, the press duration may be a time period corresponding to the press intensity in a certain range in a process from the user contacting with the motor drive switch to leaving the motor drive switch. An intensity change curve during the press process may be obtained. The time period in which the press intensity is in the certain range may be counted according to the intensity change curve. The press area may be a maximum press area, a mean press area, or a minimum press area of pressing the motor drive switch during a process from the user contacting with the motor drive switch to leaving the motor drive switch, or a press area at a certain time point. For example, if the time point is 0.01 s, and the duration of the user pressing the motor drive switch is 2 s, then the press area corresponding to the press process is the press area of pressing the motor drive switch at 0.01 s.

Further, when the motor drive switch is a touch switch, the press parameter may be number of touch points of touching the motor drive switch. For example, when the motor drive switch is touched with one finger, the number of touch points is 1; when the motor drive switch is touched with two fingers, the number of touch points is 2; when the motor drive switch is touched with three fingers, the number of touch points is 3, and so on.

At block 302, the motor is controlled to rotate according to the press parameter, to unfold or fold the flexible screen.

In embodiments of the present disclosure, the electronic device may control the motor to rotate according to different press parameters. For example, taking the press intensity as an example, when the greater the press intensity is, the faster the motor is controlled to rotate, or the more value of rotation turns the motor is controlled to rotate. During the rotation of the motor, the winding tube may be driven to unfold the flexible screen.

In some embodiments, when the flexible screen is in the fully folded state, and the press parameter with respect to the drive switch is obtained, the motor can be controlled to rotate according to the press parameter, to unfold the flexible screen. In other embodiments, when the flexible screen is in the fully unfolded state, and the press parameter with respect to the drive switch is obtained, the motor can be controlled to rotate according to the press parameter, to fold the flexible screen.

In some embodiments, an unfolding instruction for the flexible screen may be received first, When the press parameter with respect to the drive switch is obtained, the motor can be controlled to rotate according to the press parameter, to unfold the flexible screen. In other embodiments, a folding instruction for the flexible screen may be received first. When the press parameter with respect to the drive switch is obtained, the motor can be controlled to rotate according to the press parameter, to fold the flexible screen.

It can be seen that, with the above method, the flexible screen may be folded or unfolded, to obtain a suitable screen size, thus satisfying different requirements of the screen size of the user.

In at least one embodiment, between the block 301 and the block 302, following operations may be further performed.

1) determining whether the press intensity is within a preset range.

2) determining whether the press duration is greater than a second preset threshold when the press intensity is within the preset range, the operation at block 302 is performed when the press duration is greater than the second preset threshold.

At operations 1 and 2, when the press intensity is not within the preset range, or the press duration is less than or equal to the second preset threshold, the operation at block 302 is not performed. The preset range and the second preset threshold may be set by the user, which is not limited here. Certainly, the determination may be performed based on other press parameters. For example, it may be determined whether the press area is within a certain range, and if yes, the operation at block 302 is performed, and if no, the operation at block 302 is not performed. The above operations 1 and 2 may avoid theft and avoid mis-operations to some extent.

It can be seen that, in embodiments of the present disclosure, by obtaining the press parameter with respect to the motor drive switch, the motor is controlled to rotate according to the press parameter, to unfold or fold the flexible screen. Thus, the motor is controlled to rotate using the press parameter with respect to the motor drive switch, and further the flexible screen is folded or unfolded. The flexible screen may be controlled to unfold or fold to obtain a suitable screen size and satisfy different requirements of the screen size of the user.

Figure 4:
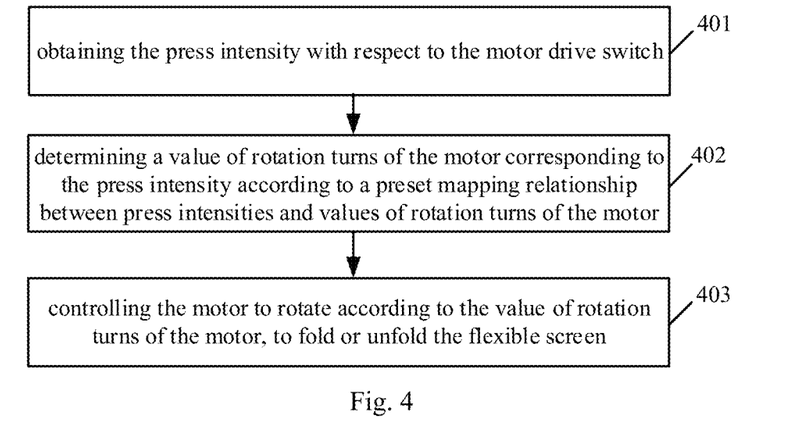
FIG. 4 is a flow chart of a method for controlling a flexible screen of an electronic device according to a second embodiment of the present disclosure.

FIG. 4 is a flow chart of a method for controlling a flexible screen of an electronic device according to a second embodiment of the present disclosure. As illustrated in FIG. 4, the method described in this embodiment includes following operations.

At block 401, the press intensity with respect to the motor drive switch is obtained.

At block 402, a value of rotation turns of the motor corresponding to the press intensity is determined according to a preset mapping relationship between press intensities and values of rotation turns of the motor.

At block 403, the motor is controlled to rotate according to the value of rotation turns of the motor, to unfold or fold the flexible screen.

The mapping relationship between press intensities and values of rotation turns of the motor may be set in advance. For example, a minimum press intensity may be set. When the press intensity with respect to the motor drive switch is greater than this minimum press intensity, the press intensity with respect to the motor drive switch can be valid. In this way, the mis-operation on the electronic device may be avoided to some extent. In addition, a maximum press intensity may also be set. When the press intensity with respect to the motor drive switch reaches the maximum press intensity, the value of rotation turns of the motor may be controlled to reach the limit, and accordingly, the flexible screen is in the fully folded state or the fully unfolded state. When the press intensity with respect to the motor drive switch is between the minimum press intensity and the maximum press intensity, the value of rotation turns of the motor corresponding to the press intensity is determined according to a formula of:

$$Y=(C-B)/(A-B)*K;$$

where, Y is the value of rotation turns of the motor corresponding to the press intensity with respect to the motor drive switch, C is the press intensity with respect to the motor drive switch, A is the maximum press intensity, B is the minimum press intensity, and D is the maximum value of rotation turns.

Certainly, a plurality of levels may be determined between the minimum press intensity and the maximum press intensity. For example, the plurality of levels include a1, a2 and a3, the value of rotation turns of the motor corresponding to a1 is b1, the value of rotation turns of the motor corresponding to a2 is b2, and the value of rotation turns of the motor corresponding to a3 is b3. Then, when the press intensity is at the level a1, the corresponding value of rotation turns of the motor is b1. Assume that the minimum press intensity is 10N and the maximum press intensity is 40N, then three levels may be set, one being 10~20N, one being 20~30N, and one being 30~40N, each level being corresponding to one value of rotation turns of the motor. When the press intensity with respect to the motor drive switch is less than 10N, the motor cannot be driven. When the press intensity with respect to the motor drive switch is greater than 40N, the motor is controlled to rotate the rotation turns such that the flexible screen enters the fully unfolded state or the fully folded state. For example, when the press intensity is 10.8N, the value of rotation turns of the motor corresponding to the level of 10~20N may be used as the value of rotation turns of the motor corresponding to the press intensity.

In regard to specific description of other operations in FIG. 4, reference may be made to specific description of respective operations in the embodiment illustrated in FIG. 3, which will not be elaborated here.

Figure 5:
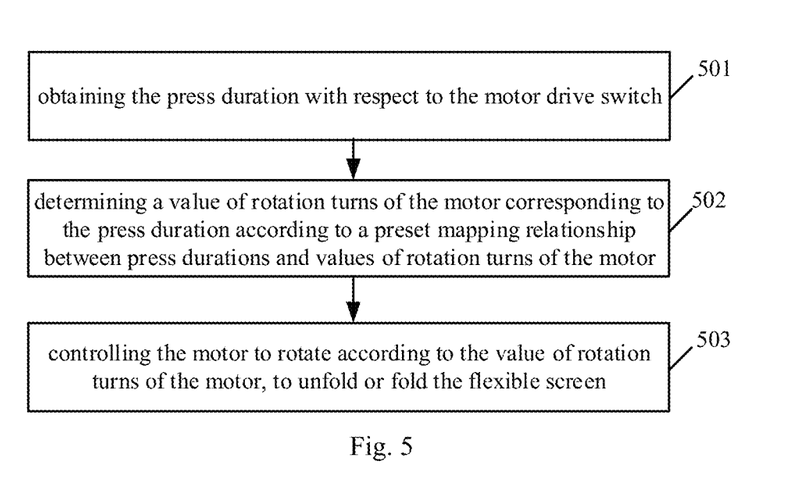
FIG. 5 is a flow chart of a method for controlling a flexible screen of an electronic device according to a third embodiment of the present disclosure.

FIG. 5 is a flow chart of a method for controlling a flexible screen of an electronic device according to a third embodiment of the present disclosure. As illustrated in FIG. 5, the method described in this embodiment includes following operations.

At block 501, the press duration with respect to the motor drive switch is obtained.

At block 502, a value of rotation turns of the motor corresponding to the press intensity is determined according to a preset mapping relationship between press durations and values of rotation turns of the motor.

At block 503, the motor is controlled to rotate according to the value of rotation turns of the motor, to unfold or fold the flexible screen.

The mapping relationship between press durations and values of rotation turns of the motor may be set in advance. For example, a minimum press duration may be set. When the press duration with respect to the motor drive switch is greater than this minimum press duration, the press duration with respect to the motor drive switch can be valid. In this way, the mis-operation on the electronic device may be avoided to some extent. In addition, a maximum press duration may also be set. When the press duration with respect to the motor drive switch reaches the maximum press duration, the value of rotation turns of the motor may be controlled to reach the limit. Therefore, the flexible screen is in the fully folded state or the fully unfolded state. When the press duration with respect to the motor drive switch is between the minimum press duration and the maximum press duration, the value of rotation turns of the motor corresponding to the press duration is determined according to a formula of:

$$Y=(C-B)/(A-B)*K;$$

where, Y is the value of rotation turns of the motor corresponding to the press duration with respect to the motor drive switch, C is the press duration with respect to the motor drive switch, A is the maximum press duration, B is the minimum press duration, and D is the maximum value of rotation turns.

Certainly, a plurality of levels may be determined between the minimum press duration and the maximum press duration. For example, the plurality of levels include a1, a2 and a3, the value of rotation turns of the motor corresponding to a1 is b1, the value of rotation turns of the motor corresponding to a2 is b2, and the value of rotation turns of the motor corresponding to a3 is b3. Then, when the press duration is at the level a1, the corresponding value of rotation turns of the motor is b1. Assume that the minimum press duration is 0.1 s, and the maximum press duration is 5 s, then three levels may be set, one being 0.1~1.5 s, one being 1.5~3.5 s, and one being 3.5~4 s, each level being corresponding to one value of rotation turns of the motor. When the press duration with respect to the motor drive switch is less than 0.1 s, the motor cannot be driven. When the press duration with respect to the motor drive switch is greater than 5 s, the motor is controlled to rotate the rotation turns such that the flexible screen enters the fully unfolded state or the fully folded state. For example, when the press duration is 1.8 s, the value of rotation turns of the motor corresponding to the level of 1.5~3.5 s may be used as the value of rotation turns of the motor corresponding to the press duration.

Certainly, before obtaining the press duration with respect to the motor drive switch, it may be first determined whether the press intensity with respect to the motor drive switch is greater than the preset threshold. When the press intensity with respect to the motor drive switch is greater than the preset threshold, the press duration with respect to the motor drive switch is obtained. The main purpose of determining the press intensity before obtaining the press duration is avoiding the mis-operations.

In regard to specific description of other operations in FIG. 5, reference may be made to specific description of respective operations in the embodiment illustrated in FIG. 3, which will not be elaborated here.

Figure 6:
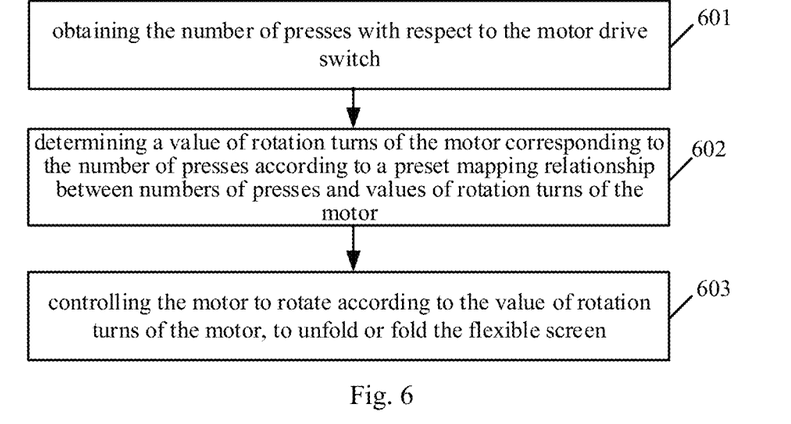
FIG. 6 is a flow chart of a method for controlling a flexible screen of an electronic device according to a fourth embodiment of the present disclosure.

FIG. 6, is a flow chart of a method for controlling a flexible screen of an electronic device according to a fourth embodiment of the present disclosure. As illustrated in FIG. 6, the method described in this embodiment includes following operations.

At block 601, the number of presses with respect to the motor drive switch is obtained.

At block 602, a value of rotation turns of the motor corresponding to the number of presses is determined according to a preset mapping relationship between the numbers of presses and values of rotation turns of the motor.

In some embodiments, whether the number of presses is less than a first preset threshold is determined. When the number of presses is less than the first preset threshold, the value of rotation turns of the motor corresponding to the number of presses is determined according to the preset mapping relationship between the numbers of presses and values of rotation turns of the motor, and the motor is controlled to rotate according to the value of rotation turns of the motor. When the number of presses is greater than or equal to the first preset threshold, the motor is controlled to rotate continuously, and when the flexible screen is fully unfolded or fully folded, the motor is controlled to stop rotating. The first preset threshold can be set by the user.

At block 603, the motor is controlled to rotate according to the value of rotation turns of the motor, to unfold or fold the flexible screen.

In some embodiments, the mapping relationship between the numbers of presses and values of rotation turns of the motor may be set in advance. For example, a minimum number of presses may be set. When the number of presses with respect to the motor drive switch is greater than this minimum number of presses, the number of presses with respect to the motor drive switch can be valid. In this way, the mis-operation on the electronic device may be avoided to some extent. In addition, a maximum number of presses may also be set. When the number presses with respect to the motor drive switch reaches the maximum number of presses, the value of rotation turns of the motor may be controlled to reach the limit, and accordingly, the flexible screen is in the fully folded state or the fully unfolded state. When the number of presses with respect to the motor drive switch is between the minimum number of presses and the maximum number of presses, the value of rotation turns of the motor corresponding to the number of presses is determined according to a formula of:

$$Y=(C-B)/(A-B)*K;$$

where, Y is the value of rotation turns of the motor corresponding to the number of presses with respect to the motor drive switch, C is the number of presses with respect to the motor drive switch, A is the maximum number of presses, B is the minimum number of presses, and D is the maximum value of rotation turns.

Certainly, a plurality of levels may be determined between the minimum number of presses and the maximum number of presses. For example, the plurality of levels include a1, a2 and a3, the value of rotation turns of the motor corresponding to a1 is b1, the value of rotation turns of the motor corresponding to a2 is b2, and the value of rotation turns of the motor corresponding to a3 is b3. Then, when the number of presses is at the level a1, the corresponding value of rotation turns of the motor is b1. Assume that the minimum number of presses is 1, and the maximum number of presses is 10, then three levels may be set, one being 1~3, one being 4~6, and one being 7~10, each level being corresponding to one value of rotation turns of the motor. When the number of presses with respect to the motor drive switch is less than 1, the motor cannot be driven. When the number of presses with respect to the motor drive switch is greater than 10, the motor is controlled to rotate the rotation turns such that the flexible screen enters the fully unfolded state or the fully folded state. For example, when the number of presses is 5, the value of rotation turns of the motor corresponding to the level of 4~6 may be used as the value of rotation turns of the motor corresponding to the number of presses.

In some embodiments, the above minimum number of presses may be 0. For example, when the number of presses with respect to the motor drive switch is 1, the value of rotation turns of the motor corresponding to this one time of press may be determined, and the motor can be controlled to rotate with the rotation turns of the motor.

Certainly, before obtaining the number of presses with respect to the motor drive switch, the electronic device may be first wakened. When the electronic device is wakened, the number of presses with respect to the motor drive switch is obtained. The main purpose of wakening the electronic device before obtaining the number of presses is avoiding the mis-operations.

In some embodiments, the above number of presses may be the number of presses within a preset time period. When the user keeps pressing the motor drive switch, one press may be counted every preset time interval. Further, during collecting the number of presses, when the time interval between two adjacent press operations is greater than a certain threshold, the number of presses is counted for a next turn. For example, when 5 presses have been counted, and the time interval between the fifth press and the sixth press is greater than the certain threshold, the finally counted number of presses is 5.

In regard to specific description of other operations in FIG. 6, reference may be made to specific description of respective operations in the embodiment illustrated in FIG. 3, which will not be elaborated here.

Figure 7:
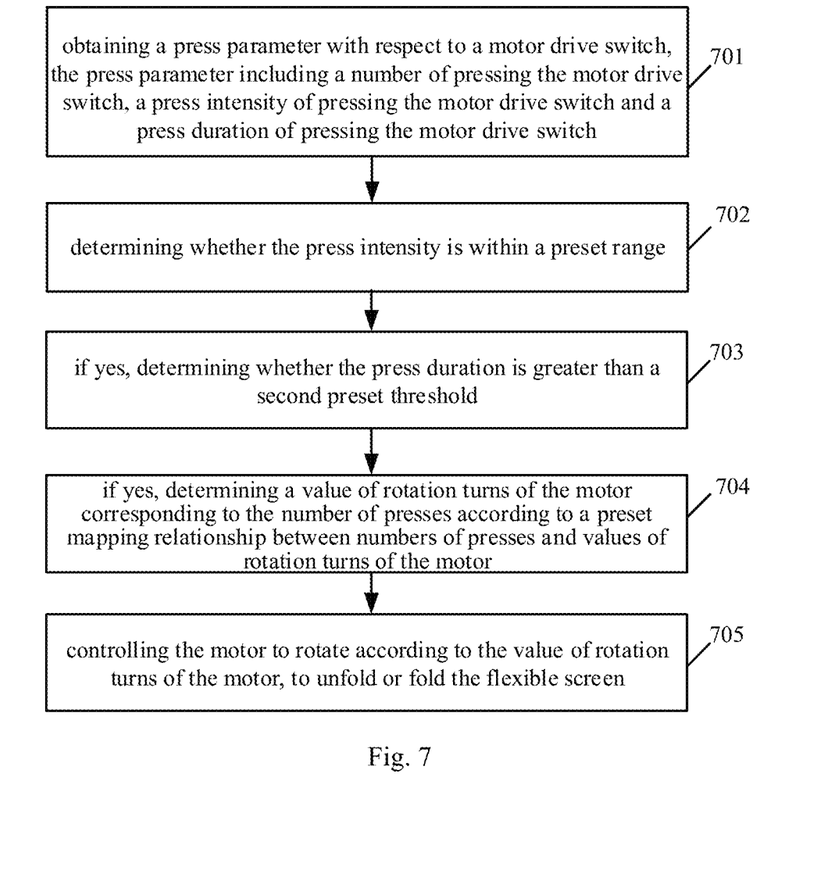
FIG. 7 is a flow chart of a method for controlling a flexible screen of an electronic device according to a fifth embodiment of the present disclosure.

FIG. 7 is a flow chart of a method for controlling a flexible screen of an electronic device according to a fifth embodiment of the present disclosure. As illustrated in FIG. 7, the method described in this embodiment includes following operations.

At block 701, the press parameter with respect to the motor drive switch is obtained. The press parameter includes the number of presses of pressing the motor drive switch, the press intensity of pressing the motor drive switch, and the press duration of pressing the motor drive switch.

At block 702, whether the press intensity is within the preset range is determined.

At block 703, when the press intensity is within the preset range, whether the press duration is greater than the second preset threshold is determined.

At block 704, when the press duration is greater than the second preset threshold, the value of rotation turns of the motor corresponding to the number of presses is determined according to the preset mapping relationship between the numbers of presses and the values of rotation turns of the motor.

At block 705, the motor is controlled to rotate according to the value of rotation turns of the motor, to unfold or fold the flexible screen.

Both the preset range and the second preset threshold may be set by the user, which is not limited here. The operation at block 703 is performed only when the press intensity is within the preset range. Moreover, the operation at block 704 is performed only when the press intensity is within the preset range and the press duration is greater than the second preset threshold. The operations at block 702 and block 703 may avoid mi-operations to some extent, and moreover, may have a certain anti-theft function. When any determination result of the operations at block 702 and block 703 is negative, the motor cannot be driven to rotate, i.e., the flexible screen cannot be folded or unfolded.

In regard to specific description of other operations in FIG. 7, reference may be made to specific description of respective operations in the embodiment illustrated in FIG. 3, which will not be elaborated here.

Embodiments of the present disclosure further provide an apparatus for controlling a flexible screen of an electronic device.

Figure 8:
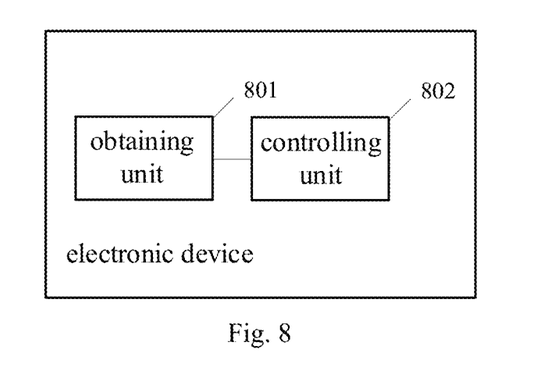
FIG. 8 is a block diagram of an apparatus for controlling a flexible screen of an electronic device according to a first embodiment of the present disclosure.

As illustrated in FIG. 8, the apparatus includes an obtaining unit 801 and a controlling unit 802.

The obtaining unit 801 is configured to obtain a press parameter with respect to a motor drive switch.

The controlling unit 802 is configured to control a motor to rotate according to the press parameter obtained by the obtaining unit 801, to unfold or fold the flexible screen.

In at least one embodiment, the press parameter includes at least one of a number of pressing the motor drive switch, a press intensity of pressing the motor drive switch, and a press duration of pressing the motor drive switch.

In at least one embodiment, the controlling unit 802 is configured to: determine a value of rotation turns of the motor corresponding to the press intensity according to a preset mapping relationship between press intensities and values of rotation turns of the motor; and control the motor to rotate according to the value of rotation turns.

In at least one embodiment, the controlling unit 802 is configured to: determine a value of rotation turns of the motor corresponding to the press duration according to a preset mapping relationship between press durations and values of rotation turns of the motor; and control the motor to rotate according to the value of rotation turns.

In at least one embodiment, the controlling unit 802 is configured to: determine a value of rotation turns of the motor corresponding to the number of presses according to a preset mapping relationship between numbers of presses and values of rotation turns of the motor when the number of presses is less than a first preset threshold, and control the motor to rotate according to the value of rotation turns; control the motor to rotate continuously till the flexible screen is fully folded or fully unfolded when the number of presses is greater than or equal to the first preset threshold.

Figure 9:
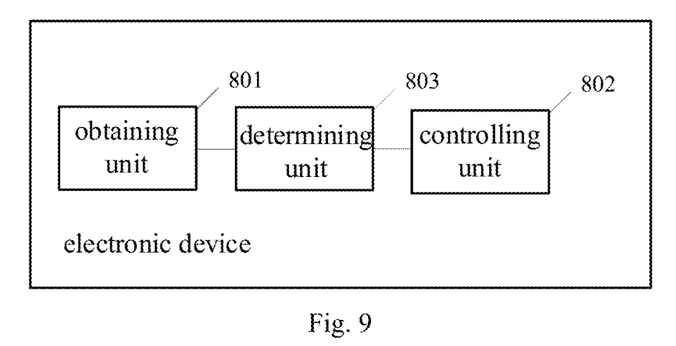
FIG. 9 is a block diagram of an apparatus for controlling a flexible screen of an electronic device according to a second embodiment of the present disclosure.

As illustrated in FIG. 9, the apparatus illustrated in FIG. 8 may further include a determining unit 803.

The determining unit 803 is configured to determine whether the press intensity is within a preset range after the obtaining unit 801 obtains the press parameter with respect to the motor drive switch, and determine whether the press duration is greater than a second preset threshold after determining that the press intensity is within the present range, and determine a value of rotation turns of the motor corresponding to the number of presses according to a preset mapping relationship between numbers of presses and values of rotation turns of the motor after determining that the press duration is greater than the second preset threshold. The controlling unit 802 controls the motor to rotate according to the value of rotation turns of the motor.

It can be seen that, the electronic device described in embodiments of the present disclosure may obtain the press parameter with respect to the motor drive switch, and control the motor to rotate according to the press parameter, to unfold or fold the flexible screen. Thus, the flexible screen is folded and unfolded, and further the folding and unfolding of the flexible screen can be controlled, such that a suitable screen size may be obtained, satisfying different requirements of the screen size of the user.

It can be understood that, functions of respective program modules of the electronic device in this embodiment may be implemented according to above method embodiments, with respect to the specific implementation of which, reference can be made to related description of the above method embodiments, which will not be elaborated here.

Figure 10:
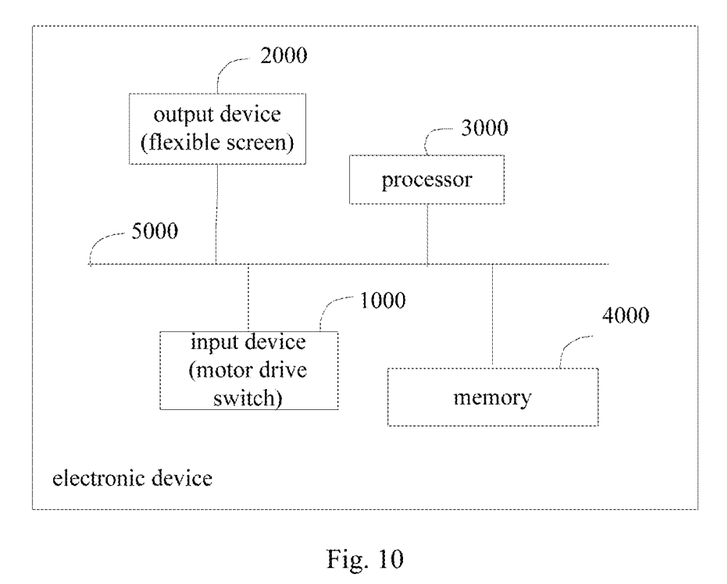
FIG. 10 is a block diagram of an electronic device according to a first embodiment of the present disclosure.

FIG. 1O is a block diagram of an electronic device according to a first embodiment of the present disclosure. The electronic device described in this embodiment includes: at least one input device 1000; at least one output device 2000; at least one processor 3000, for example, CPU; and a memory 4000. The above input device 1000, output device 2000, processor 3000 and memory 4000 are coupled via a bus 5000.

The input device 1000 may be a touch panel, a physical button, or a mouse, a motor drive switch, or the like.

The output device 2000 may be a flexible screen.

The memory 4000 may be a high speed RAM, or may be a non-volatile memory, for example, a disk memory. The memory 4000 is configured to store a set of program codes. The input device 1000, the output device 2000 and the processor 3000 are configured to call the program codes stored in the memory 4000, to perform following operations.

The processor 3000 is configured to: obtain a press parameter with respect to a motor drive switch; and control a motor to rotate according to the press parameter, to unfold or fold the flexible screen.

In at least one embodiment, the press parameter includes at least one of a number of pressing the motor drive switch, a press intensity of pressing the motor drive switch, and a press duration of pressing the motor drive switch.

In at least one embodiment, the processor 3000 is configured to control the motor to rotate according to the press parameter, by: determining a value of rotation turns of the motor corresponding to the press intensity according to a preset mapping relationship between press intensities and values of rotation turns of the motor; and controlling the motor to rotate according to the value of rotation turns.

In at least one embodiment, the processor 3000 is configured to control the motor to rotate according to the press parameter, by: determining a value of rotation turns of the motor corresponding to the press duration according to a preset mapping relationship between press durations and values of rotation turns of the motor; and controlling the motor to rotate according to the value of rotation turns.

In at least one embodiment, the processor 3000 is configured to control the motor to rotate according to the press parameter, by: determining a value of rotation turns of the motor corresponding to the number of presses according to a preset mapping relationship between numbers of presses and values of rotation turns of the motor when the number of presses is less than a first preset threshold, and controlling the motor to rotate according to the value of rotation turns; controlling the motor to rotate continuously till the flexible screen is fully folded or fully unfolded when the number of presses is greater than or equal to the first preset threshold.

In at least one embodiment, after obtaining the press parameter with respect to the motor drive switch, and before controlling the motor to rotate according to the press parameter, the processor 3000 is further configured to: determine whether the press intensity is within a preset range; determine whether the press duration is greater than a second preset threshold when determining that the press intensity is within the preset range, and determine a value of rotation turns of the motor corresponding to the number of presses according to a preset mapping relationship between numbers of presses and values of rotation turns of the motor when determining that the press duration is greater than the second preset threshold.

Embodiments of the present disclosure further provide a computer storage medium. The computer storage medium is stored with computer programs for electronic data exchange. The computer programs are configured to cause a computer to execute all or a part of operations of any control method of an electronic device disclosed in above method embodiments.

Figure 11:
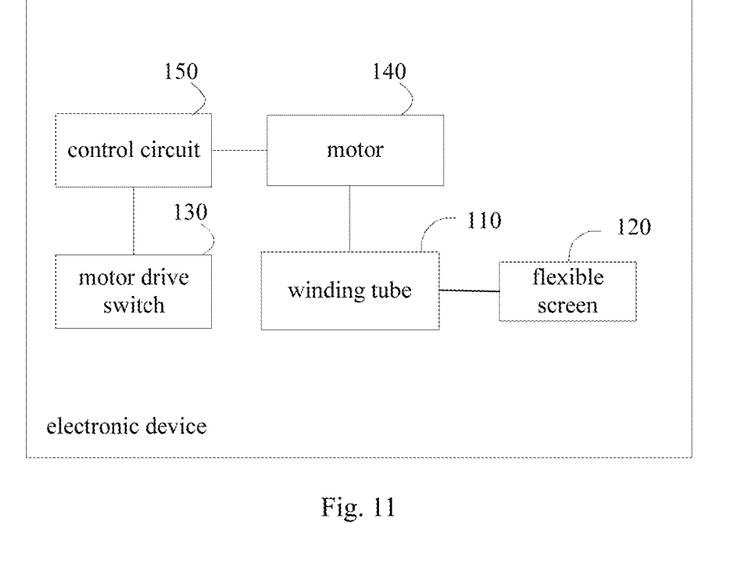
FIG. 11 is a block diagram of an electronic device according to a second embodiment of the present disclosure.

FIG. 11 is a block diagram of an electronic device according to a second embodiment of the present disclosure. The electronic device includes a winding tube 110, a flexible screen 120, a motor drive switch 130, a motor 140 and a control circuit 150.

The flexible screen 120 is operable to wind around the winding tube 110. The motor drive switch 130 is configured to obtain a press parameter when the motor drive switch 130 is pressed. The motor 140 is coupled to the winding tube 110. The control circuit 150 is coupled to the motor drive switch 130 and the motor 140 respectively, and is configured to receive the press parameter, and to control the motor 140 to rotate according to the press parameter, to unfold or fold the flexible screen 120.

The control circuit 150 may work similar to those described in method embodiments, which will not be elaborated here.

Embodiments of the present disclosure further provide a computer program product. The computer program product includes a non-transitory computer readable storage medium stored with computer programs. The computer programs are operable to cause a computer to execute all or a part of operations of any control method of an electronic device disclosed in above method embodiments.

Although the present disclosure is described here in combination with respective embodiments, those skilled in the art may understand and implement other variants of the disclosed embodiments by viewing the drawings, the disclosure, and the appending claims during implementing the claimed inventions. In the claims, the term "comprising" does not exclude other components or steps, "a" or "an" does not exclude a plural form. A single processor or other units may implement several functions listed in the claims. Some measures are disclosed in mutually different dependent claims, but this does not imply that these measures cannot be combined to produce a better effect.

Those skilled in the art should understand that, embodiments of the present disclosure may be provided as a method, an apparatus (device) or a computer program product. Thus, the present disclosure may be implemented in a form of hardware, software, or a combination of hardware and software. Moreover, the preset disclosure may be implemented in a form of computer program product implemented on one or more computer accessible storage medium (including, but not limited to, disk memory, CD-ROM, and optical memory) and containing computer accessible program codes. The computer program is stored/distributed in a suitable medium, which is provided together with other hardware or acts as a part of the hardware. The computer program may also be distributed in other forms, for example, via the Internet or other wired or wireless telecommunication systems.

The present disclosure is described with reference to flow charts and/or block diagrams of a method, apparatus (device) and computer program product of embodiments of the present disclosure. It should be understood that, each flow and/or block in the flow charts and/or block diagrams, and a combination of flows and/or blocks in the flow charts and/or block diagrams may be implemented by computer program instructions. These computer program instructions may be provided to a general-purpose computer, a dedicated computer, an embedded processor, or a processor of other programmable data processing device to produce a machine, such that the instructions executed by the computer or the processor of other programmable data processing device generate an apparatus for implementing functions specified in one or more flows of the flow chart and/or one or more blocks in the block diagram.

These computer program instructions may also be stored in a computer readable memory that can guide the computer or the other programmable data processing devices to work in a special way, such that the instructions stored in the computer readable memory generate a manufactured article including a command device. The command device implements functions specified in one or more flows of the flow chart and/or one or more blocks in the block diagram.

These computer program instructions may also be loaded to the computer or the other programmable data processing devices, such that a series of operations is executed on the computer or the other programmable data processing devices to generate processing implemented by the computer, and thus the instructions executed on the computer or the other programmable data processing devices provide operations for implementing functions specified in one or more flows of the flow chart and/or one or more blocks in the block diagram.

Although the present disclosure is described in combination with specific feature and embodiments thereof, it is obvious that various modification and combination can be made without departing form the spirit and the scope of the present disclosure. Accordingly, the specification and the drawings are merely exemplary illustration of the present disclosure defined by the appending claims, and are regarded to cover any and all modification, change, combination or equivalent in the scope of the present disclosure. Obviously, those skilled in the art may make various change and variants to the present disclosure, without departing from the spirit and the scope of the present disclosure. In this case, when these change and variants of the present disclosure belong to the scope of the claims and the equivalent technologies, the present disclosure intends to include these change and variants.

What is claimed is:

1. A control method of an electronic device having a flexible screen, comprising:
obtaining a press parameter with respect to a motor drive switch, wherein the press parameter comprises a press duration of pressing the motor drive switch, in which the press duration is a time period corresponding to a press intensity in a range in a process from the user contacting with the motor drive switch to leaving the motor drive switch, and the press duration is obtained by obtaining an intensity change curve during a press process and counting the time period in which the press intensity is in the range according to the intensity change curve; and
controlling a motor to rotate according to a preset mapping relationship between press durations and values of rotation turns of the motor, in which one or more of the following is controlled according to the press intensity: a rotation speed and the value of rotation turns of the motor, the motor being configured to unfold or fold the flexible screen and control a speed or degree of folding or unfolding the flexible screen,
wherein the press parameter further comprises at least one of a number of presses of pressing the motor drive switch, and a press intensity of pressing the motor drive switch, and
wherein, after obtaining the press parameter with respect to the motor drive switch and before controlling the motor to rotate according to the press parameter, the method further comprises:
determining whether the press intensity is within a preset range;
determining whether the press duration is greater than a second preset threshold when determining that the press intensity is within the preset range; and performing the operation of controlling the motor to rotate according to the press parameter when determining that the press duration is greater than the second preset threshold.

2. The method according to claim 1, wherein controlling the motor to rotate according to the press parameter comprises:
determining the value of rotation turns of the motor corresponding to the press intensity according to a preset mapping relationship between press intensities and values of rotation turns of the motor; and
controlling the motor to rotate according to the value of rotation turns.

3. The method according to claim 1, wherein controlling the motor to rotate according to the press parameter comprises:
determining the value of rotation turns of the motor corresponding to the press duration according to a preset mapping relationship between press durations and values of rotation turns of the motor; and
controlling the motor to rotate according to the value of rotation turns.

4. The method according to claim 1, wherein controlling the motor to rotate according to the press parameter comprises:
determining the value of rotation turns of the motor corresponding to the number of presses according to a preset mapping relationship between numbers of presses and values of rotation turns of the motor when the number of presses is less than a first preset threshold, and controlling the motor to rotate according to the value of rotation turns;
controlling the motor to rotate continuously, and controlling the motor to stop rotating till the flexible screen is fully folded or fully unfolded when the number of presses is greater than or equal to the first preset threshold.

5. An electronic device comprising:
a flexible screen, and
one or more processors,
wherein the one or more processors configured to:
obtain a press parameter with respect to a motor drive switch, wherein the press parameter comprises a press duration of pressing the motor drive switch, in which the press duration is a time period corresponding to a press intensity in a range in a process from the user contacting with the motor drive switch to leaving the motor drive switch, and the press duration is obtained by obtaining an intensity change curve during a press process and counting the time period in which the press intensity is in the range according to the intensity change curve; and
control a motor to rotate according to a preset mapping relationship between press durations and values of rotation turns of the motor, in which one or more of the following is controlled according to the press intensity: a rotation speed and the value of rotation turns of the motor, the motor being configured to unfold or fold the flexible screen and control a speed or degree of folding or unfolding the flexible screen according to the press intensity,
wherein the press parameter further comprises at least one of a number of presses of pressing the motor drive switch, and a press intensity of pressing the motor drive switch, and
wherein the one or more processors are configured to determine whether the press intensity is within a preset range after the press parameter is obtained with respect to the motor drive switch, and determine whether the press duration is greater than a second preset threshold after determining that the press intensity is within the present range, wherein when the press duration is determined to be greater than the second preset threshold, the motor is controlled to rotate according to the press parameter.

6. The electronic device according to claim 5, wherein one or more processors are configured to:
determine a value of rotation turns of the motor corresponding to the press intensity according to a preset mapping relationship between press intensities and values of rotation turns of the motor; and
control the motor to rotate according to the value of rotation turns.

7. The electronic device according to claim 5, wherein one or more processors are configured to:
determine a value of rotation turns of the motor corresponding to the press duration according to a preset mapping relationship between press durations and values of rotation turns of the motor; and
control the motor to rotate according to the value of rotation turns.

8. The electronic device according to claim 5, wherein one or more processors are configured to:
determine a value of rotation turns of the motor corresponding to the number of presses according to a preset mapping relationship between numbers of presses and values of rotation turns of the motor when the number of presses is less than a first preset threshold, and control the motor to rotate according to the value of rotation turns;

control the motor to rotate continuously and control the motor to stop rotating till the flexible screen is fully folded or fully unfolded when the number of presses is greater than or equal to the first preset threshold.

9. An electronic device comprising:
a flexible screen,
a processor, and
a memory,
wherein the processor is configured to perform a control method by calling codes or instructions stored in the memory, the control method comprises:
obtaining a press parameter with respect to a motor drive switch, wherein the press parameter comprises a press duration of pressing the motor drive switch, in which the press duration is a time period corresponding to a press intensity in a range in a process from the user contacting with the motor drive switch to leaving the motor drive switch, and the press duration is obtained by obtaining an intensity change curve during a press process and counting the time period in which the press intensity is in the range according to the intensity change curve; and
controlling a motor to rotate according to a preset mapping relationship between press durations and values of rotation turns of the motor, in which one or more of the following is controlled according to the press intensity: a rotation speed and the value of rotation turns of the motor, the motor being configured to unfold or fold the flexible screen and control a speed or degree of folding or unfolding the flexible screen,
wherein, after obtaining the press parameter with respect to the motor drive switch and before controlling the motor to rotate according to the press parameter, the control method further comprises:
determining whether the press intensity is within a preset range;
determining whether the press duration is greater than a second preset threshold when determining that the press intensity is within the preset range; and performing the operation of controlling the motor to rotate according to the press parameter when determining that the press duration is greater than the second preset threshold.

10. The electronic device according to claim 9, wherein the press parameter further comprises at least one of a number of presses of pressing the motor drive switch, and a press intensity of pressing the motor drive switch.

11. The electronic device according to claim 9, wherein controlling the motor to rotate according to the press parameter comprises:
determining a value of rotation turns of the motor corresponding to the press intensity according to a preset mapping relationship between press intensities and values of rotation turns of the motor; and
controlling the motor to rotate according to the value of rotation turns.

12. The electronic device according to claim 9, wherein controlling the motor to rotate according to the press parameter comprises:
determining a value of rotation turns of the motor corresponding to the press duration according to a preset mapping relationship between press durations and values of rotation turns of the motor; and
controlling the motor to rotate according to the value of rotation turns.

13. The electronic device according to claim 9, wherein controlling the motor to rotate according to the press parameter comprises:
determining a value of rotation turns of the motor corresponding to the number of presses according to a preset mapping relationship between numbers of presses and values of rotation turns of the motor when the number of presses is less than a first preset threshold, and controlling the motor to rotate according to the value of rotation turns;
controlling the motor to rotate continuously, and controlling the motor to stop rotating till the flexible screen is fully folded or fully unfolded when the number of presses is greater than or equal to the first preset threshold.

* * * * *